(12) United States Patent
Nguyen

(10) Patent No.: US 8,738,771 B2
(45) Date of Patent: May 27, 2014

(54) SECURE GRAPHICAL OBJECTS IN WEB DOCUMENTS

(76) Inventor: Julien T. Nguyen, Saratoga, CA (US)

( * ) Notice: Subject to any disclaimer, the term of this patent is extended or adjusted under 35 U.S.C. 154(b) by 1134 days.

(21) Appl. No.: 11/513,584

(22) Filed: Aug. 31, 2006

(65) Prior Publication Data
US 2006/0294237 A1    Dec. 28, 2006

Related U.S. Application Data

(63) Continuation of application No. 10/418,951, filed on Apr. 18, 2003, now Pat. No. 7,325,077, which is a continuation of application No. 08/918,096, filed on Aug. 21, 1997, now Pat. No. 6,564,250.

(51) Int. Cl.
| | |
|---|---|
| *G06F 15/173* | (2006.01) |
| *G06F 7/04* | (2006.01) |
| *G06F 17/30* | (2006.01) |
| *G06F 12/00* | (2006.01) |
| *G06F 12/14* | (2006.01) |
| *G06F 13/00* | (2006.01) |
| *G11C 7/00* | (2006.01) |
| *H04N 7/16* | (2011.01) |

(52) U.S. Cl.
USPC ............. 709/225; 709/223; 709/224; 726/2; 726/16; 726/27; 726/29

(58) Field of Classification Search
None
See application file for complete search history.

(56) References Cited

U.S. PATENT DOCUMENTS

| | | | |
|---|---|---|---|
| 5,204,947 A | | 4/1993 | Bernstein et al. |
| 5,341,426 A | * | 8/1994 | Barney et al. ................. 713/171 |
| 5,345,588 A | | 9/1994 | Greenwood et al. |
| 5,347,578 A | | 9/1994 | Duxbury |
| 5,369,702 A | | 11/1994 | Shanton |
| 5,377,354 A | | 12/1994 | Scannell et al. |
| 5,386,469 A | | 1/1995 | Yearsley et al. |
| 5,386,471 A | | 1/1995 | Bianco |

(Continued)

FOREIGN PATENT DOCUMENTS

WO        9950744       10/1999

OTHER PUBLICATIONS

"Advisory Action", U.S. Appl. No. 10/446,623, (Mar. 19, 2009),3 pages.

(Continued)

*Primary Examiner* — Azizul Choudhury

(57) ABSTRACT

The invention provides a method and system for presenting information in a web document using a program applet to restrict further copying or redistribution. The web document includes a first region in which a graphical element or other information is displayed, and a second region covering the first region in which a program applet is invoked by a server for the web document. The program applet is dynamically created upon access, and assigned a serial number. The program applet contacts the server for permission to display the graphical element or other information; thus, the server can control, by granting or denying permission, when and if the program applet displays the graphical or other information. The program applet can be subjected by the server to one or more of a variety of restrictions, such as: a limit on the number of times the information is displayed, a time limit, a requirement for a password or other security authentication, a requirement that the program applet is executing at a selected device or from a selected web document, or other requirements the server may deem fit to impose.

28 Claims, 1 Drawing Sheet

(56) References Cited

U.S. PATENT DOCUMENTS

| | | |
|---|---|---|
| 5,388,156 A | 2/1995 | Blackledge, Jr. et al. |
| 5,392,351 A | 2/1995 | Hasebe et al. |
| 5,394,469 A | 2/1995 | Nagel et al. |
| 5,400,403 A | 3/1995 | Fahn et al. |
| 5,410,598 A | 4/1995 | Shear |
| 5,432,849 A | 7/1995 | Johnson et al. |
| 5,438,508 A | 8/1995 | Wyman |
| 5,442,541 A | 8/1995 | Hube et al. |
| 5,450,489 A | 9/1995 | Ostrover et al. |
| 5,473,687 A | 12/1995 | Lipscomb et al. |
| 5,499,109 A | 3/1996 | Mathur et al. |
| 5,504,814 A | 4/1996 | Miyahara |
| 5,508,817 A | 4/1996 | Kunigami |
| 5,513,126 A | 4/1996 | Harkins et al. |
| 5,530,235 A | 6/1996 | Stefik et al. |
| 5,548,745 A | 8/1996 | Egan et al. |
| 5,548,789 A | 8/1996 | Nakanura |
| 5,572,643 A | 11/1996 | Judson |
| 5,572,648 A | 11/1996 | Bibayan |
| 5,574,843 A | 11/1996 | Gerlach, Jr. |
| 5,588,105 A | 12/1996 | Foster et al. |
| 5,592,549 A | 1/1997 | Nagel et al. |
| 5,594,491 A | 1/1997 | Hodge et al. |
| 5,594,936 A | 1/1997 | Rebec et al. |
| 5,606,609 A * | 2/1997 | Houser et al. ............... 713/179 |
| 5,615,264 A | 3/1997 | Kazmierczak et al. |
| 5,619,648 A | 4/1997 | Canale et al. |
| 5,623,503 A | 4/1997 | Rutkowski |
| 5,623,603 A | 4/1997 | Jiang et al. |
| 5,627,764 A | 5/1997 | Schutzman et al. |
| 5,629,980 A | 5/1997 | Stefik et al. |
| 5,630,060 A | 5/1997 | Tang et al. |
| 5,638,443 A | 6/1997 | Stefik et al. |
| 5,646,992 A | 7/1997 | Subler et al. |
| 5,652,749 A | 7/1997 | Davenport et al. |
| 5,666,542 A | 9/1997 | Yamazaki et al. |
| 5,673,316 A * | 9/1997 | Auerbach et al. ............... 705/51 |
| 5,675,507 A | 10/1997 | Bobo, II |
| 5,680,619 A | 10/1997 | Gudmundson et al. |
| 5,694,163 A | 12/1997 | Harrison |
| 5,705,502 A | 1/1998 | Zimmermann |
| 5,706,502 A | 1/1998 | Foley et al. |
| 5,710,863 A | 1/1998 | Chen |
| 5,710,883 A | 1/1998 | Hong et al. |
| 5,724,574 A | 3/1998 | Stratigos et al. |
| 5,727,159 A | 3/1998 | Kikinis |
| 5,732,218 A | 3/1998 | Bland et al. |
| 5,734,835 A | 3/1998 | Selker |
| 5,737,519 A | 4/1998 | Abdelnour et al. |
| 5,737,599 A | 4/1998 | Rowe et al. |
| 5,737,619 A | 4/1998 | Judson |
| 5,742,768 A | 4/1998 | Gennaro et al. |
| 5,745,569 A * | 4/1998 | Moskowitz et al. ............ 705/58 |
| 5,754,235 A | 5/1998 | Urano et al. |
| 5,754,700 A | 5/1998 | Kuzma |
| 5,754,765 A | 5/1998 | Danneels et al. |
| 5,754,851 A | 5/1998 | Wissner |
| 5,761,071 A * | 6/1998 | Bernstein et al. ............ 700/237 |
| 5,761,673 A | 6/1998 | Bookman et al. |
| 5,764,235 A | 6/1998 | Hunt et al. |
| 5,768,391 A * | 6/1998 | Ichikawa ..................... 713/153 |
| 5,768,505 A | 6/1998 | Gilchrist et al. |
| 5,781,741 A | 7/1998 | Imamura et al. |
| 5,781,785 A | 7/1998 | Rowe et al. |
| 5,784,058 A | 7/1998 | LaStrange et al. |
| 5,784,553 A | 7/1998 | Kolawa et al. |
| 5,787,175 A * | 7/1998 | Carter ........................... 713/165 |
| 5,787,470 A | 7/1998 | DeSimone et al. |
| 5,794,039 A | 8/1998 | Guck |
| 5,794,259 A | 8/1998 | Kikinis |
| 5,802,530 A | 9/1998 | Van Hoff |
| 5,805,829 A | 9/1998 | Cohen et al. |
| 5,809,512 A | 9/1998 | Kato |
| 5,818,435 A | 10/1998 | Kozuka et al. |
| 5,818,447 A | 10/1998 | Wolf et al. |
| 5,821,926 A | 10/1998 | Arita |
| 5,826,102 A | 10/1998 | Escobar et al. |
| 5,828,839 A | 10/1998 | Moncreiff |
| 5,835,683 A | 11/1998 | Corella et al. |
| 5,842,020 A | 11/1998 | Faustini |
| 5,845,299 A | 12/1998 | Arora et al. |
| 5,848,415 A | 12/1998 | Guck |
| 5,850,444 A * | 12/1998 | Rune ............................... 705/79 |
| 5,850,446 A | 12/1998 | Berger et al. |
| 5,854,299 A | 12/1998 | Muhlebach et al. |
| 5,854,893 A | 12/1998 | Ludwig et al. |
| 5,859,967 A | 1/1999 | Kaufeld et al. |
| 5,862,260 A | 1/1999 | Rhoads |
| 5,870,544 A | 2/1999 | Curtis |
| 5,872,915 A | 2/1999 | Dykes et al. |
| 5,875,322 A | 2/1999 | House et al. |
| 5,878,223 A | 3/1999 | Becker et al. |
| 5,889,942 A | 3/1999 | Orenshteyn |
| 5,890,129 A * | 3/1999 | Spurgeon ........................... 705/4 |
| 5,898,836 A | 4/1999 | Freivald et al. |
| 5,903,646 A * | 5/1999 | Rackman ........................ 705/51 |
| 5,909,545 A | 6/1999 | Frese, II et al. |
| 5,911,776 A | 6/1999 | Guck |
| 5,918,012 A | 6/1999 | Astiz et al. |
| 5,918,013 A | 6/1999 | Mighdoll et al. |
| 5,923,846 A * | 7/1999 | Gage et al. ..................... 709/213 |
| 5,923,885 A | 7/1999 | Johnson et al. |
| 5,933,498 A * | 8/1999 | Schneck et al. ................. 705/54 |
| 5,937,160 A | 8/1999 | Davis et al. |
| 5,940,834 A | 8/1999 | Pinard et al. |
| 5,949,431 A * | 9/1999 | Matsumura et al. .......... 345/635 |
| 5,956,491 A | 9/1999 | Marks |
| 5,956,701 A | 9/1999 | Habermehl |
| 5,963,217 A | 10/1999 | Grayson et al. |
| 5,995,093 A | 11/1999 | Lambourne et al. |
| 6,008,836 A | 12/1999 | Bruck et al. |
| 6,009,462 A | 12/1999 | Birrell et al. |
| 6,014,688 A | 1/2000 | Venkatraman et al. |
| 6,014,694 A | 1/2000 | Aharoni et al. |
| 6,029,164 A | 2/2000 | Birrell et al. |
| 6,032,150 A | 2/2000 | Nguyen |
| 6,067,565 A | 5/2000 | Horvitz |
| 6,067,579 A | 5/2000 | Hardman et al. |
| 6,073,163 A | 6/2000 | Clark et al. |
| 6,108,027 A | 8/2000 | Andrews et al. |
| 6,131,116 A | 10/2000 | Riggins et al. |
| 6,185,551 B1 | 2/2001 | Birrell et al. |
| 6,185,625 B1 | 2/2001 | Tso et al. |
| 6,212,535 B1 | 4/2001 | Weikart et al. |
| 6,233,600 B1 | 5/2001 | Salas et al. |
| 6,285,889 B1 | 9/2001 | Nykanen et al. |
| 6,289,105 B1 * | 9/2001 | Murota ........................... 380/286 |
| 6,329,994 B1 | 12/2001 | Gever et al. |
| 6,343,302 B1 | 1/2002 | Graham |
| 6,377,978 B1 | 4/2002 | Nguyen |
| 6,401,134 B1 | 6/2002 | Razavi et al. |
| 6,542,923 B2 | 4/2003 | Nguyen |
| 6,564,250 B1 | 5/2003 | Nguyen |
| 6,584,498 B2 | 6/2003 | Nguyen |
| 6,601,108 B1 | 7/2003 | Marmor |
| 6,718,321 B2 | 4/2004 | Birrell et al. |
| 6,779,178 B1 | 8/2004 | Lloyd et al. |
| 7,647,550 B1 | 1/2010 | Nguyen |
| 2002/0059447 A1 | 5/2002 | Nguyen |
| 2002/0147788 A1 | 10/2002 | Nguyen |
| 2009/0327522 A1 | 12/2009 | Nguyen |
| 2010/0115388 A1 | 5/2010 | Nguyen |

OTHER PUBLICATIONS

"Non Final Office Action", U.S. Appl. No. 10/446,623, (Apr. 16, 2009), 26 pages.

"Notice of Allowance/Base Issue Fee", U.S. Appl. No. 10/446,623, (Sep. 4, 2009), 7 pages.

"Non Final Office Action", U.S. Appl. No. 11/512,793, (Aug. 24, 2010), 19 pages.

"Non Final Office Action", U.S. Appl. No. 12/552,188, (Sep. 30, 2010), 19 pages.

(56) References Cited

OTHER PUBLICATIONS

"Non Final Office Action", U.S. Appl. No. 10/446,623, (Apr. 29, 2008), 16 pages.
Anonymous, "Graphical Command Line," IBM Technical Disclosure Bulletin, vol. 32, No. 8B, pp. 313-314, XP002109975, New York, US, Jan. 1990.
Anonymous, "Editing Word Processor Documents," IBM Technical Disclosure Bulletin, vol. 40, No. 7, pp. 187-188, XP002109976, New York, US, Jul. 1997.
David, Stephen R., "Teach Yourself Java Programming the Quick and Easy Way with Microsoft Visual: Learn Java now," Microsoft Press 3 0402 00136 8093, Jan. 1996.
Tessier, Tom, "Using JavaScript to Create Interactive Web Pages," Dr. Dobb's Journal, Mar. 1, 1996, pp. 1-12.
Brown, Mark, "Using Netscape 2-special Edition," Jan. 1, 1995, pp. 147-168 and 214-232.
Brown, Mark, "Using Netscape 2-Special Edition," Jan. 1, 1995, pp. 327-331 and 334-375.
Fox, A. et al., "Adapting to Network and Client Variability via On-Demand Dynamic Distillation," Jan. 1, 1996, pp. 1-11.
Fox, A. et al., "Reducing WWW Latency and Bandwidth Requirements by Real-Time Distillation," Jan. 1, 1996, pp. 1-12.
Brooks, C. et al., "Application-Specific Proxy Servers as HTTP Stream Transducers," World Wide Web Journal, Jan. 1, 1995, pp. 1-11.
Shimada et al., "Interactive Scaling Control Mechanism for World-Wide Web Systems," Computer Networks and ISDN Systems, vol. 29, Sep. 1, 1997, pp. 1467-1477.
Bolot et al., "Scalable Feedback Control for Multicast Video Distribution in the Internet," SIGCOMM 94, Jan. 1, 1994, pp. 58-67.
Blumenfield, Julie R., et al. "Step-by-Step to a World-Class Web Site," Windows Magazine, vol. 6, No. 8., Jul. 1, 1995, pp. 1-14.
Brown, Marc H. et al., "A New Paradigm for Browsing the Web," Mosaic of Creativity, May 7-11, 1995, pp. 320-321.
Graham, Malcom et al., "Webbed Documents," ACM 0-89791-713-8/95/0010, Oct. 1, 1995, pp. 58-62.
Huang, Chung-Ming et al., "Multimedia E-Mail: The Evolution Approach Based on Adapters," Software Practice & Experience, vol. 24, No. 9, Sep. 1, 1994, pp. 785-900.
Ouhyoung M et al., "The MOS Multimedia E-Mail System," Proceedings of the International Conference on Multimedia Computing and Systems, May 19, 1994, pp. 315-324.
Baker, Steven, "Hypertext Browsing on the Internet," UNIX Review, vol. 12, No. 9, Sep. 1, 1994, pp. 1-5.
Berg, Cliff, "How Do I Send E-mail from a Java Applet?," Dr. Dobbs Journal, vol. 21, Issue 8, Aug. 1, 1996, pp. 1-5.
"Code Samples and Apps—Applets," http://java.sun.com/applets, Feb. 25, 2005, pp. 1-2.
Doan, Amy, "Java Perks Up Client Mail," InfoWorld, vol. 18, Issue 42, Oct. 14, 1996, p. 1.
Doan, Amy, "Lotus Demonstrates cc:Mail for Java Prototype Client," InfoWorld, vol. 18, Issue 51, Dec. 16, 1996, p. 47.
McNamara, Paul, "Start-up Novita makes multimedia E-mail a snap," Network World, vol. 13, Issue 50, Dec. 9, 1996, p. 31.
"Special Edition Using HTML, 2nd Edition—Chapter 29 Using WebAuthor," Que Corporation, Jan. 1, 1996, pp. 1-13.

\* cited by examiner

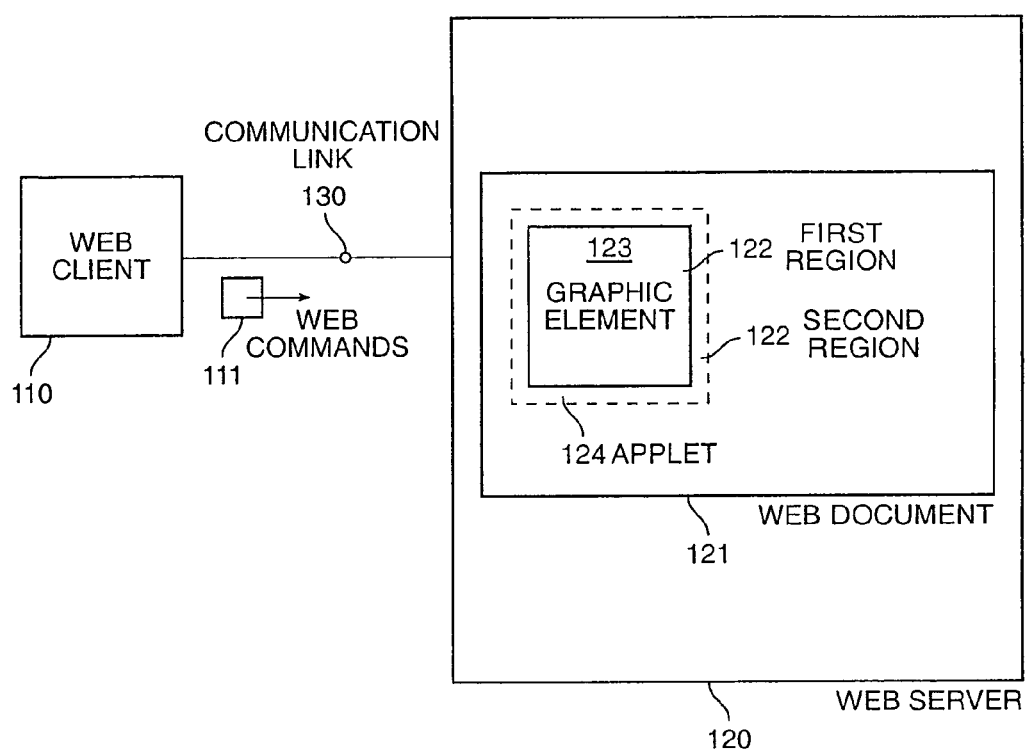

SECURE GRAPHICAL OBJECTS IN WEB DOCUMENTS

This application is a continuation of U.S. patent application Ser. No. 10/418,951, filed on Apr. 18, 2003, now U.S. Pat. No. 7,325,077 which is a continuation of U.S. patent application Ser. No. 08/918,096, filed on Aug. 21, 1997, now U.S. Pat. No. 6,564,250.

BACKGROUND

1. Field of the Invention

The invention relates to web documents.

2. Description of the Related Art

"Web documents" are hypertext documents, including information and capable of including hypertext pointers to other web documents. Other web documents can be located on the same computer or on another computer in a network of computers, the largest such network of which is commonly known as the "internet" (but such networks may be independent networks or may be part of a private network commonly known as an "intranet"). The information in web documents can include text, graphical elements, program applets, and other information formats.

One problem which has arisen in the art is that servers of web documents desire to be able to present information to web clients, without those web clients being able to copy that information and retain it permanently. This problem is particularly acute for graphical information, which must be transmitted to the web client display, but once transmitted can be retained and even edited by the web client using graphical editing tools.

Known web documents sometimes include reduced-size ("thumbnail") graphical elements, which substitute for full size graphical elements and allow the user of the web client to have an idea of the nature of the full size graphical element. Payment can be required before the user of the web client is given access to the full size graphical element.

While this method has some value in preventing wholesale copying of graphical elements and other information from web documents, it suffers from several drawbacks. First, the web client can copy the information from the thumbnail graphical element, and the user of that web client can use graphical editing tools to enhance the quality of the thumbnail graphical element. Second, once the user has paid for the full size graphical element, there is nothing (other than possible legal restrictions) preventing the user from copying and redistributing that full size graphical element.

Accordingly, it would be desirable to provide a method and system for presenting graphical elements and other information in web documents, without allowing web clients unrestricted ability to copy and redistribute that information. This advantage is achieved in an embodiment of the invention in which each graphical element in a web document is protected by a program applet, which can display the graphical element or other information for a limited time.

SUMMARY

The invention provides a method and system for presenting information in a web document using a program applet to restrict further copying or redistribution. The web document includes a first region in which a graphical element or other information is displayed, and a second region covering the first region in which a program applet is invoked by a server for the web document. The program applet is dynamically created upon access, and assigned a serial number. The program applet contacts the server for permission to display the graphical element or other information; thus, the server can control, by granting or denying permission, when and if the program applet displays the graphical or other information.

In a preferred embodiment, the program applet can be subjected by the server to one or more of a variety of restrictions, such as: a limit on the number of times the information is displayed, a time limit, a requirement for a password or other security authentication, a requirement that the program applet is executing at a selected device or from a selected web document, or other requirements the server may deem fit to impose.

BRIEF DESCRIPTION OF THE DRAWINGS

FIG. 1 shows a block diagram of a system including a web client and a web server, the web server having a web document including graphical information protected by a program applet.

DETAILED DESCRIPTION

In the following description, a preferred embodiment of the invention is described with regard to preferred process steps and data structures. Those skilled in the art would recognize after perusal of this application that embodiments of the invention can be implemented using general purpose processors or special purpose processors adapted to particular process steps and data structures described herein, and that implementation of the process steps and data structures described herein would not require undue experimentation or further invention.

Inventions described herein can be used in conjunction with inventions described in the following applications:

Application Ser. No. 08/918,096, Filed Aug. 21, 1997, in the name of the same inventor, titled "Micro-Client For Internet Appliance", now U.S. Pat. No. 6,564,250; and Application Ser. No. 08/918,698, Filed Aug. 21, 1997, in the name of the same inventor, titled "Active Electronic Mail", now U.S. Pat. No. 6,542,923.

Each of these applications is hereby incorporated by reference as if fully set forth herein.

System Including Web Client and Server

FIG. 1 shows a block diagram of a system including a web client and a web server, the web server having a web document including graphical information protected by a program applet.

The system 100 includes a web client 110 and a web server 120 coupled by a communication link 130. The web client 110 can be responsive to an operator or user. The web client 110 issues web commands 111 and transmits those web commands 111 to the web server 120 using the communication link 130. The web server 120 response to those web commands 111 and serves a web document 121 to the web client 110 using the communication link 130.

In a preferred embodiment, the communication link 130 includes a network of computers, such as the network of networks known as the "internet", but can in addition or instead include a private network sometimes known as an "intranet" or an "extranet". In alternative embodiments, the communication link 130 may include other techniques for communication between the web client 110 and the web server 120, such as for example a frame relay network, or local area network, or a switched telephone network.

The web document 121 includes information which the web server 120 transmits to the web client 110 for presentation to the user. For example, this information can include text, graphical elements, program applets, and information in other formats.

The web document 121 can also include a set of regions 122 which the user may select and which the web client 110 may thus direct the web server 120 to take further action in response thereto. For example, the web client 110 can direct the web server 120 to transmit further information to the web client 110 for presentation to the user, the web client 110 can direct the web server 120 to follow a hyperlink and thus transmit a related web document 121 to the web client 110, or the web client 110 can direct the web server 120 to invoke a program at the web server 120 for generating further information for transmission to the web client 110 and presentation to the user.

Information Protected by Program Applet

A first region 122 of the web document 121 includes a graphical element 123 which is presented to the user as part of the web document 121. A second region 122 of the web document 121 includes a program applet 124 which is transmitted to and invoked at the web client 110 in response to the user selecting that second region 122. The second region 122 is positioned to completely cover the first region 122, so if the user attempts to select the first region 122 (and thus to select the graphical element 123), the second region 122 (and thus the program applet 124) is instead selected. Thus, it is not possible for the user to select the graphical element 123 directly, as all locations in the first region 122 instead operate to select the program applet 124.

The program applet 124 is dynamically created at or about the time of selection by the server 120, and is given a unique ID by the server 120. In a preferred embodiment, the unique ID includes a serial number and a checksum, encrypted by the server 120 so that the unique ID cannot be easily spoofed by the user.

The program applet 124 is disposed to execute at the web client 110 and to present the graphical element 123 in further detail (or other further information) to the user at the web client 110. Each time the program applet 124 executes to present the further information, it contacts the server 120 for permission to do so. The server 120 associates the specific program applet 124 having the unique ID with a set of conditions under which the program applet 124 can continue to display the further information to the user.

In a preferred embodiment, the set of conditions includes one or more of the following:

The program applet can be limited to a selected number of times it is permitted to present the further information (for example, no more than one time).

The program applet can be limited to a selected period of time it is permitted to present the further information (for example, for no more than one hour from creation, or only during selected times of day or days of the week).

The program applet can be limited to presenting the further information only if the user presents a selected authenticator (such as a password associated with the specific program applet).

The program applet can be limited to presenting the further information from a selected device, network domain, or web document (such as only from the original web document, or only from the specific device hosting the server).

The program applet can be limited to presenting the further information only upon satisfaction of a financial condition (such as upon a selected payment from the user, or upon confirmation by the server of a license for the user).

The program applet can be limited to selected types of presentation of the further information (such as being able to present, but refusing to print or save, the further information).

In a preferred embodiment, the server 120 can modify the conditions associated with the specific program applet 124, per unique ID, or can dynamically create a new specific program applet 124 with a new unique ID, upon satisfaction of selected conditions by the user. For example, the server 120 can require that the user pay for further use, or obtain administrative permission for further use, or impose other conditions on further use, of the program applet 124.

ALTERNATIVE EMBODIMENTS

Although preferred embodiments are disclosed herein, many variations are possible which remain within the concept, scope, and spirit of the invention, and these variations would become clear to those skilled in the art after perusal of this application.

I claim:

1. An apparatus comprising a computing device having instructions that in response to being executed by the computing device, enable the computing device to cause performance of operations comprising:
   providing a document in response to a request from a client for the document, wherein the document includes a first region comprising protected content of the document and a second region comprising unprotected content of the document and the first region of the document, wherein at least a portion of the protected content is visibly presented as part of the document, and wherein the first region and the second region are parts of same document; and
   associating a software component with the second region, the software component being sent by the computing device and being executable at the client to contact the computing device for permission to access the protected content, wherein the second region is located over the first region to protect the first region and to keep unauthorized access away from the first region, and wherein an attempt to access the first region causes the second region to be accessed and causes execution of the software component.

2. The apparatus as recited in claim 1 wherein the instructions are executable by the computing device to selectively permit access to the protected content dependent on one or more conditions.

3. The apparatus as recited in claim 2 wherein the one or more conditions comprise a limit on a number of permitted accesses to the protected content.

4. The apparatus as recited in claim 2 wherein the one or more conditions comprise an access time limit.

5. The apparatus as recited in claim 2 wherein the one or more conditions comprise a requirement for authentication.

6. The apparatus as recited in claim 2 wherein the one or more conditions comprise a limit on a location at which the software component executes during use.

7. The apparatus as recited in claim 6 wherein the location is a network domain.

8. The apparatus as recited in claim 6 wherein the location is a device.

9. The apparatus as recited in claim 6 wherein the limit is applied to the document.

10. The apparatus as recited in claim 2 wherein the one or more conditions comprise a limit on a type of access to the protected content.

11. The apparatus as recited in claim 10 wherein the type comprises read-only access.

12. The apparatus as recited in claim 2 wherein the one or more conditions comprise a limit that prevents print access to the protected content.

13. The apparatus as recited in claim 2 wherein the one or more conditions comprise a limit that prevents copying of the protected content.

14. The apparatus as recited in claim 2 wherein the one or more conditions comprise satisfaction of a financial condition.

15. The apparatus as recited in claim 1 wherein the instructions are configured to cause the computing device to associate the software component with the document in response to a request to access the protected content.

16. The apparatus as recited in claim 15 wherein the instructions are configured to cause the computing device to generate the software component in response to the request.

17. The apparatus as recited in claim 1 wherein the software component is configured to provide a unique identifier when requesting permission to access the protected content.

18. The apparatus as recited in claim 1 wherein the protected content comprises a graphical image.

19. The apparatus as recited in claim 1 wherein the protected content is text.

20. The apparatus as recited in claim 1 wherein the software component is an applet.

21. A method implemented by a computer, comprising:
providing a document in response to a request to the computer from a client for the document, the document including a first region comprising protected content of the document and a second region comprising unprotected content of the document and the first region of the document, wherein at least a portion of the protected content is visibly presented as part of the document, and wherein the first region and the second region are parts of same document;
associating a software component with the second region, wherein the associating is performed by the computer;
using the computer to transmit the document and the software component to the client over a network; and
receiving, at the computer, a request from the software component to access the protected content, the request formed in response to an attempt to access the protected content of the first region of the document through execution of the software component at the client, wherein the second region is located over the first region to protect the first region and to keep unauthorized access away from the first region, and wherein an attempt to access the first region causes the second region to be accessed and causes execution of the software component.

22. The method as recited in claim 21 further comprising selectively permitting access to the protected content dependent on one or more conditions.

23. The method as recited in claim 21 wherein the software component is an applet.

24. A method implemented by a computer, comprising:
issuing a request to a server for a document, the document having a first region comprising protected content of the document and a second region comprising unprotected content of the document and the first region of the document, wherein at least a portion of the protected content is visibly presented as part of the document, and wherein the first region and the second region are parts of same document; and
contacting the server for permission to access the protected content in response to an input indicating an attempt to access the protected content of the first region, the contacting performed responsive to execution, by the computer, of a software component that is associated with the second region and is received from the server, wherein the second region is located over the first region to protect the first region and to keep unauthorized access away from the first region, and wherein an attempt to access the first region causes the second region to be accessed and causes execution of the software component.

25. The method as recited in claim 24 further comprising: displaying the protected content in response to the server granting permission; and not displaying the protected content in response to the server denying permission.

26. A method implemented by a computer, comprising:
contacting a server that sourced a document in response to an input indicating an attempt to access protected content of the document, wherein the document includes a first region comprising the protected content of the document and a second region comprising unprotected content of the document and the first region of the document, wherein at least a portion of the protected content is visibly presented as part of the document, and wherein the first region and the second region are parts of same document, wherein the contacting is initiated in response to execution, by the computer, of a software component that is associated with the second region and that was provided to the computer responsive to a request for the document; and
displaying the protected content in response to receiving permission from the server, wherein the second region is located over the first region to protect the first region and to keep unauthorized access away from the first region, and wherein an attempt to access the first region causes the second region to be accessed and causes execution of the software component.

27. The method as recited in claim 26 further comprising preventing display of the protected content in response to receiving a denial of permission from the server.

28. The method as recited in claim 26 wherein the contacting of the server comprises transmitting a unique identifier to the server that was associated with the software component in response to the request for the document.

* * * * *